No. 817,516. PATENTED APR. 10, 1906.
T. RALL.
MOVABLE BRIDGE.
APPLICATION FILED SEPT. 26, 1905.

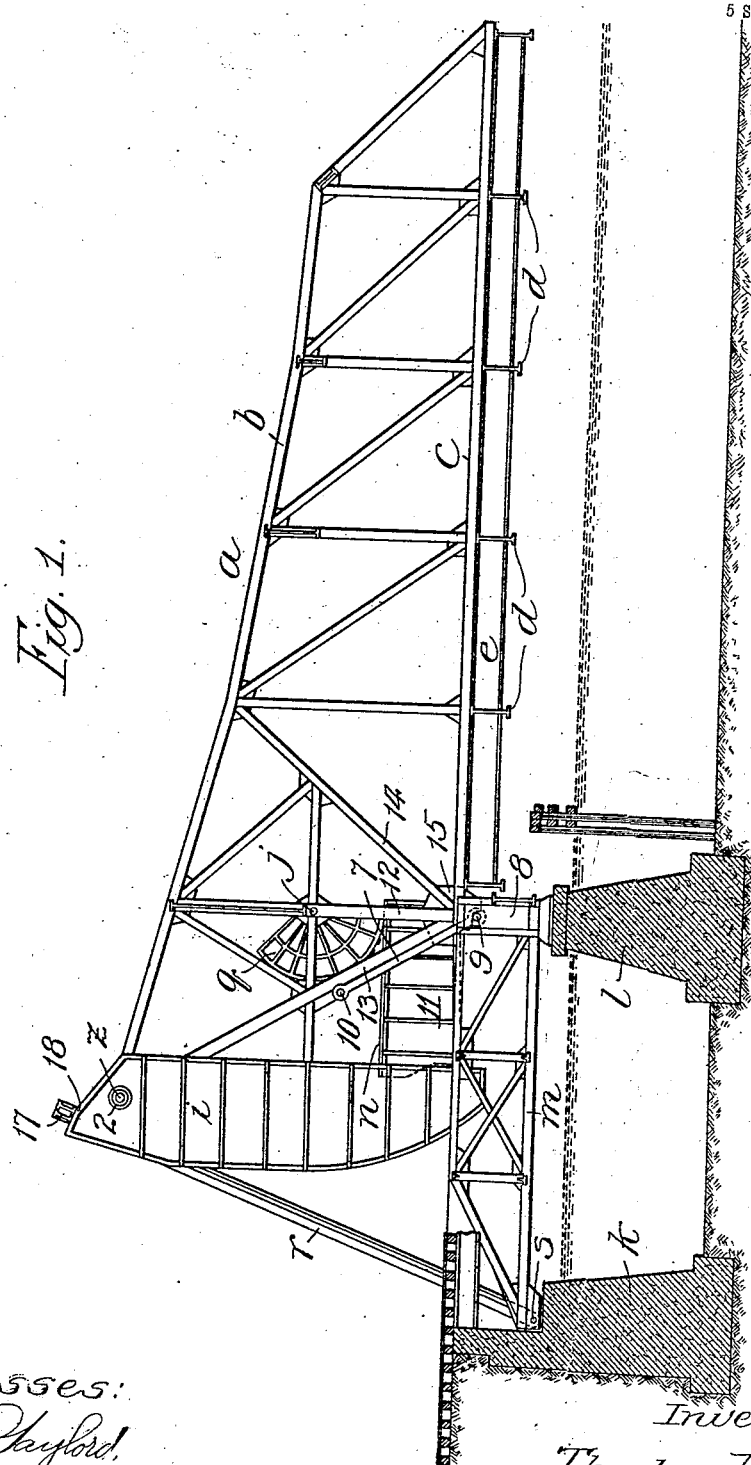

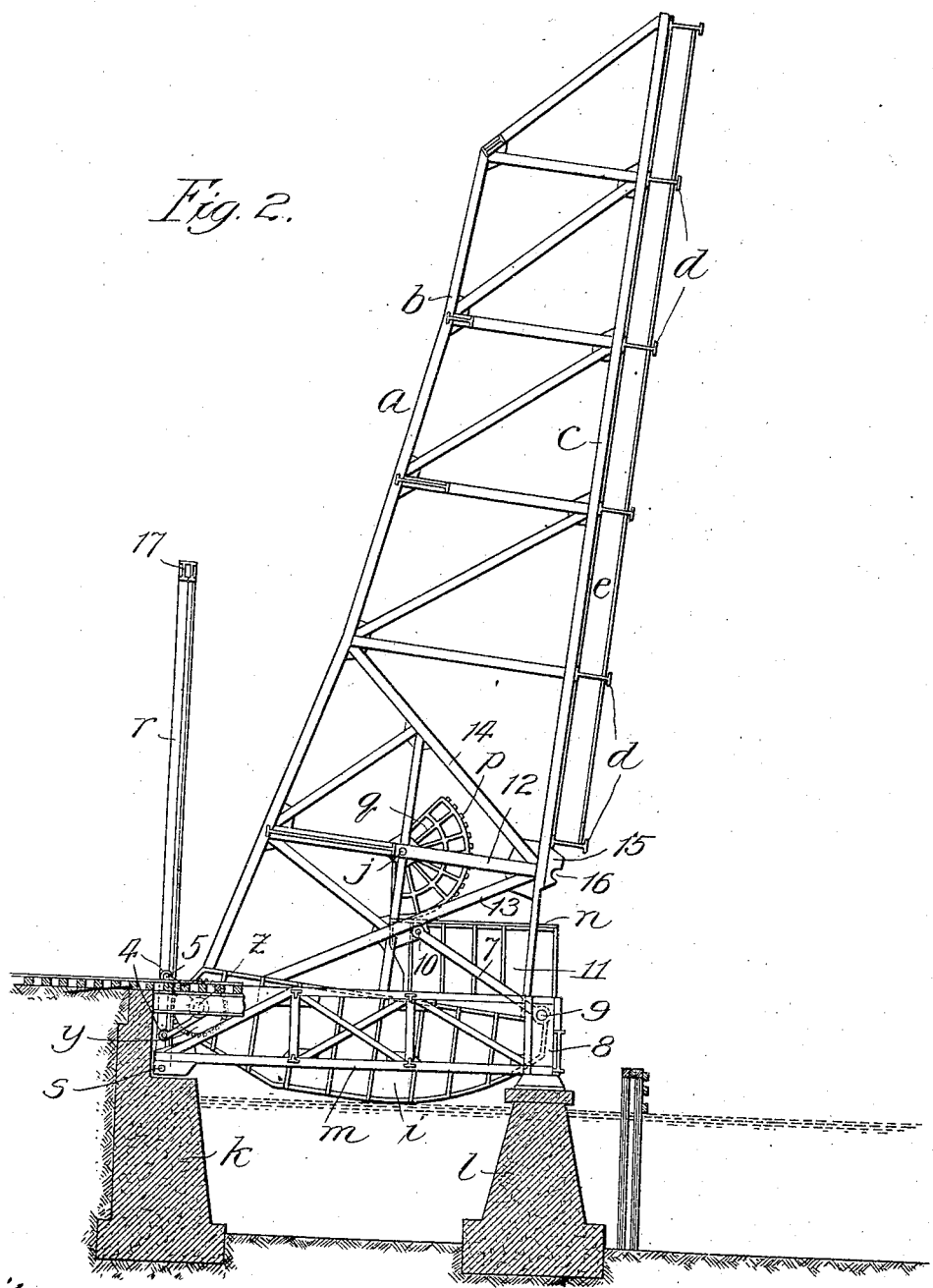

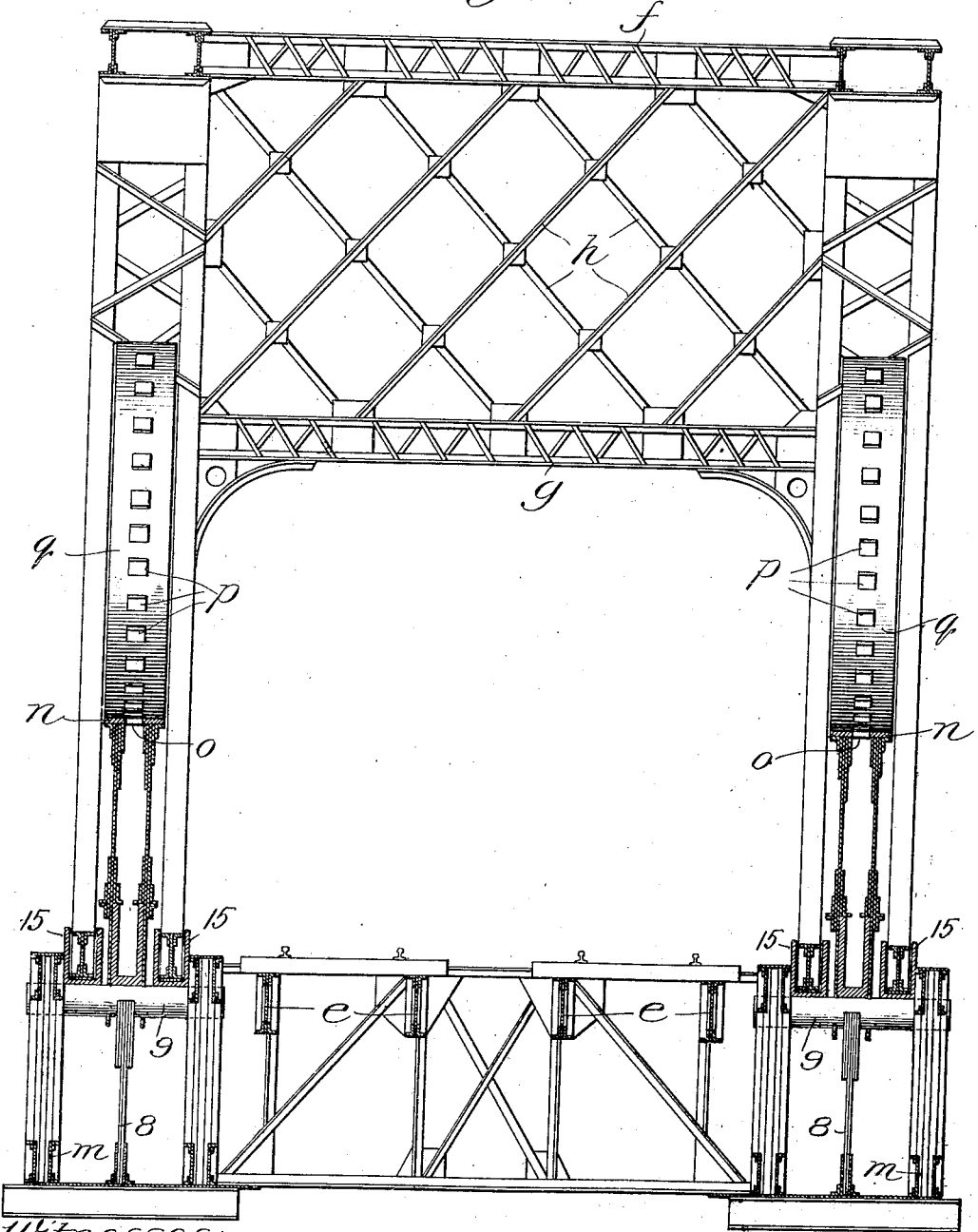

5 SHEETS—SHEET 4.

Witnesses:
Chas E Gaylord
John Enders

Inventor:
Theodor Rall,
By Thomas F. Sheridan,
Atty

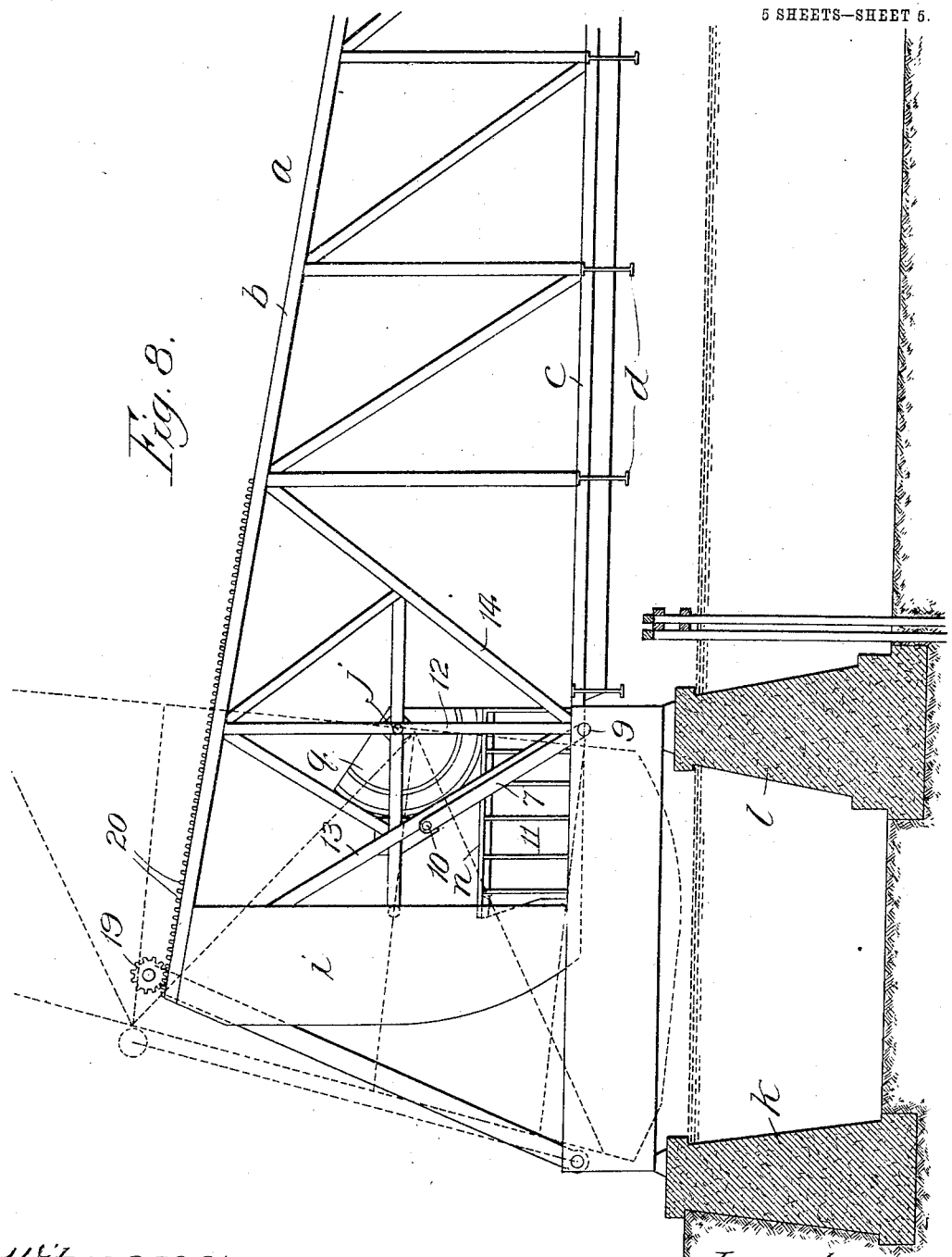

BEST AVAILABLE COPY

UNITED STATES PATENT OFFICE.

THEODOR RALL, OF CHICAGO, ILLINOIS.

MOVABLE BRIDGE.

No. 817,516.　　　Specification of Letters Patent.　　　Patented April 10, 1906.

Application filed September 26, 1905. Serial No. 280,142.

*To all whom it may concern:*

Be it known that I, THEODOR RALL, a citizen of the United States, residing at Chicago, in the county of Cook and State of Illinois, have invented certain new and useful Improvements in Movable Bridges, of which the following is a specification.

This invention relates to that type of movable bridges known as "bascule" or "lift" bridges, having a span or spans movable to open and closed positions by raising and lowering the outer end portion of the span.

The principal object of my invention is to provide a simple, economical, and efficient movable bridge.

A further object of the invention is to provide a bridge of the bascule type with simple and efficient means by which it may be operated and supported in all positions into which it is movable.

Other and further objects of the invention will appear from an examination of the drawings and the following description and claims.

The invention consists principally in providing a span having an upwardly and downwardly movable outer end and oscillating anchor-arm mechanism articulately connected with a stationary part or support and operatively connected with the movable span for operating it and controlling or limiting its movement.

It consists, further, in the features, combinations, and details of construction hereinafter described and claimed.

Figure 6:
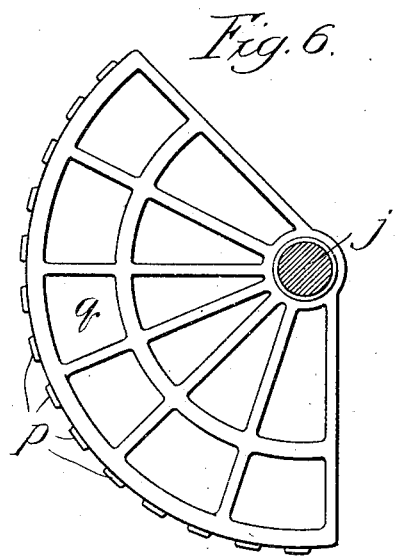
Figure 7:
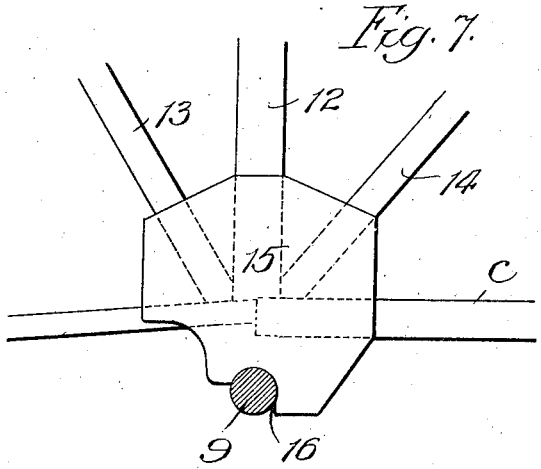
Figure 4:
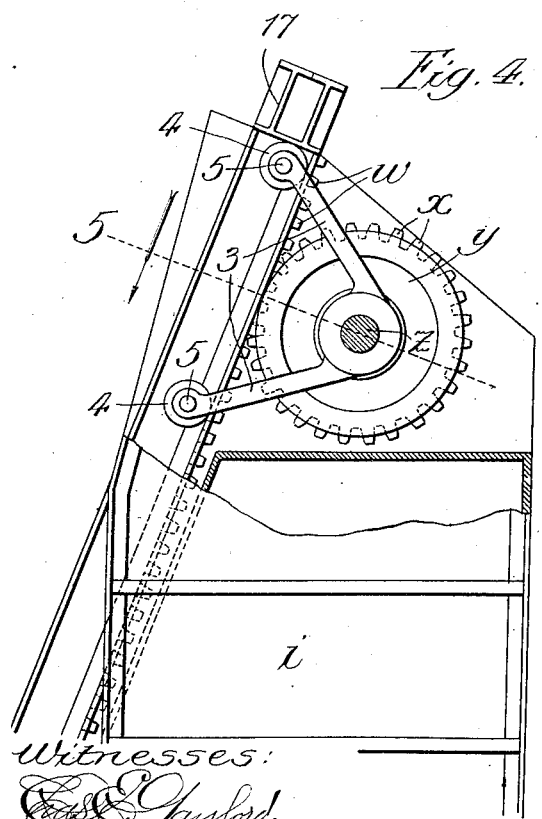
Figure 5:
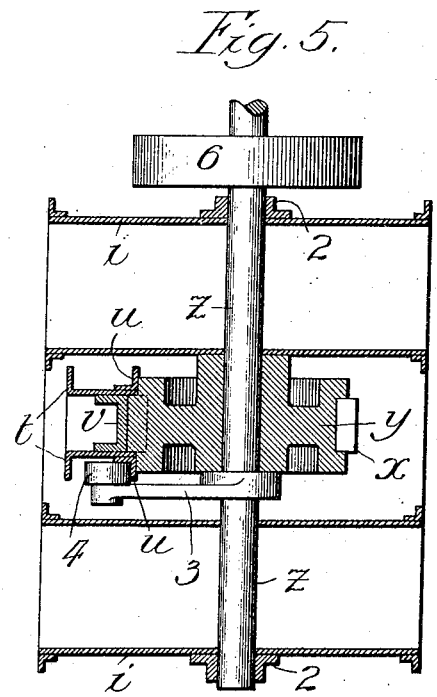

In the accompanying drawings, Figure 1 is a side elevation of a span of a bridge with its supporting and operating mechanisms constructed in accordance with my improvements, showing the span in lowered operative or closed position; Fig. 2, a side elevation of the mechanism shown in Fig. 1, showing the span in raised or open position; Fig. 3, an end view of the bridge in elevation, partly in section, certain parts being omitted for purpose of clearness; Fig. 4, a detail view in elevation, showing the anchored strut or arm mechanism with its rack-and-pinion mechanism, a portion of the framework being broken away to show the upper part of the counterweight; Fig. 5, a transverse sectional view taken on line 5 of Fig. 4 looking in the direction of the arrow, showing one of the main anchor arms or struts in section; Fig. 6, a detail view in elevation of one of the rotatable supporting-segments; Fig. 7, a detail view in elevation, showing the means for supporting the weight of the span when in closed or lower operative position independently of the rotatable supporting mechanism; and Fig. 8, a side elevation of a modification, showing the operating-rack upon the bridge-span and the pinion upon the main anchor-arm mechanism.

In constructing a bridge in accordance with my improvements I provide one or more spans $a$. When the space to be bridged is comparatively short, one span is sufficient, and when the space requires a plurality of spans or arms they may be of identical construction and supported and operated in the same manner, so that their outer upwardly and downwardly swinging ends swing toward and from each other and are adapted to form a continuous bridge. It is therefore believed to be unnecessary to describe more than one span and its operating and supporting mechanisms, as the description of such span and operating and supporting devices apply in all respects to each of a plurality of spans or arms.

The span $a$ comprises a pair of side trusses each having a top chord $b$ and a bottom chord $c$, between which trusses the floor or railway-track, as the case may be, is laid, the weight of such floor or track being supported by transverse beams $d$ and longitudinal members $e$, forming a floor-framework which connects the lower portions of the side trusses and is adapted to carry the load which the bridge is required to support. The side truss portions of the span are connected at the shore end by means of a transverse framework formed of I-beams $f$ and $g$ and struts $h$, and a counterweight $i$ balances the span so that its center of gravity is at the pivotal point indicated by the position of the pivots $j$, which pivotally support the span and are movable back and forth, as hereinafter described. A stationary support is provided in the form of piers $k$ and $l$, and a framework in the form of trusses $m$ extends from one to the other of such piers. The piers are mounted at a sufficient distance from each other to provide a space over which the shore or pivoted end of the bridge swings. Upon this stationary support, which may be of any ordinary and well-known type, is mounted a pair of stationary tracks $n$, each provided with perforations $o$ for receiving the teeth $p$ of rotatable or rocking supporting-segments $q$, which are movably mounted upon such tracks and pivotally connected with the span by means of a pivot or stub-shaft $j$, already described. These rocking segments thus form a rotatable supporting mechanism reciprocatingly mounted and adapted to move back and forth upon the supporting-tracks, so as to permit the bridge to be moved bodily back and forth and also permit the outer end of the span to swing upwardly and downwardly upon the horizontally-movable pivotal center of the span.

A pair of anchor-arms $r$ are mounted one on each side of the shore end of the bridge, with their lower ends pivotally or flexibly connected or anchored to a stationary part, such as the pier $k$, by means of a pivot $s$. Each of these anchor-arms is formed of side members $t$ in the form of angle-irons. On the outside of such side members are mounted tracks $u$, also formed of angle-irons, and between such side members is mounted a rack $v$, having teeth $w$, which are adapted to engage the teeth $x$ of a spur-gear $y$, which is rotatably mounted upon the upper portion of the span by means of a shaft $z$. This shaft is mounted in suitable bearings 2 in the span and is provided with arms 3, loosely mounted thereon, each of such arms being provided with guiding antifriction-rollers 4, rotatably mounted at the outer ends of the arms upon trunnions 5, in engagement with the tracks $u$ already described. The rack-and-pinion mechanism thus operatively connect the anchor-arm mechanism and span and provide means for raising and lowering the span.

The shaft $z$, which supports the operating-pinion, may be provided with a gear-wheel 6 or other means of any ordinary and well-known type for operatively connecting the shaft and its bridge-operating gear mechanism with a suitable source of power, such as a dynamo or engine, which may be mounted either upon the span or upon a stationary support in any ordinary and well-known manner.

A second set of anchor arms or links 7 at each side of the shore end of the span are pivotally connected at their lower ends to a stationary support, such as the supporting frame portion 8, by means of a supporting-pin 9, which is beneath the center of gravity of the span when in lowered or closed position. The upper ends of such anchor-arms 7 are each pivoted to the span by means of a pivot-pin 10 at a point rearward from the center of gravity of the span and the supporting-pivot $j$, which supports such span upon the reciprocating and supporting segments.

The supporting-tracks $n$, which support the rocking segments, and thereby the weight of the span while being raised and lowered and while in raised position, are carried by strong supporting-girders 11 and the trusses $m$, which extend from pier to pier, as already described. It is very desirable, however, to provide means for supporting the weight of the span when in lowered or closed position independently of this supporting-track and the movable supporting mechanisms or rocking segments, so as to relieve such rotatable supporting mechanism of the weight of the span and its load when the span is in lowered operative or closed position. To accomplish this, the supporting-rod 9, already described, is mounted upon or supported by the pier at a point beneath the pivots $j$ and the center of gravity of the span when in lowered or closed operative position, and struts 12, 13, and 14, which form parts of the side truss members of the span, converge directly over the supporting-rod 9. Supporting-plates 15 are secured to such struts or side truss members on each side of the span and provided with notches 16, adapted to engage the supporting-pin when the span is in its lowered or operative position and support the weight of the span upon such pin, thereby relieving the rotatable supporting mechanisms of the weight of the span and its load.

The pivoted anchor-arms $r$ are provided at their upper ends with a transversely-extending beam 17, which may be formed of a pair of I-beams or in any ordinary and well-known manner, connecting the upper ends of such anchored arms and adapted to engage the upper stop-shoulder portions 18 of the span at the upper ends of the counterweights and top of the inner or pivoted end of the span, thus providing limiting stop mechanism for limiting the downward movement of the outer swinging end of the span. The span when in lowered extended position is thus supported independently of any pier or other support beneath its outer end and also independently of the movable supporting mechanism at the pivoted end of the bridge.

In operation the rotation of the operating pinion mechanism $y$ in the direction necessary to raise the outer upwardly and downwardly movable end of the span will cause the pinions to travel downward in engagement with the rack portions of the adjacent anchored arms $r$, and the anchored arms or links 7 being pivotally secured to the span by means of the pivot-pins 10 and to a stationary support at their lower ends by means of the rods 9 will cause the span to move bodily shoreward upon the rotating supporting-segments and their supporting-tracks and at the same time cause the outer swinging end of the span to be raised to open position.

The rotation of the operating pin mechanism in the opposite direction will cause the span to move back to initial position with its center of gravity over the supporting-rods 9 and will cause the supporting-plates to engage such rods beneath the center of gravity or pivotal center of the bridge, thus relieving the rotating or rocking supporting mechanism of the weight of the span and supporting it entirely independently of such rotating mechanisms when in closed or lowered position.

In Fig. 8 a modified form of anchored arm and operating rack-and-pinion mechanism is shown, the pinion 19 being rotatably mounted upon the anchored arm or strut and the rack 20 being mounted upon the span of the bridge.

I claim—

1. In a bascule-bridge, the combination of a span having an upwardly and downwardly movable end, a stationary support, a supporting-track mounted upon such stationary support, movable supporting mechanism mounted upon such track and pivotally connected with the span, and movable anchor-arms pivotally connected with a stationary part and operatively connected with the span.

2. In a bascule-bridge, the combination of a span having an upwardly and downwardly movable end, a stationary support, mechanism mounted upon the stationary support and pivotally connected with the span for supporting it, anchor mechanism pivotally connected with a stationary part, and rack-and-pinion mechanism operatively connected with such anchor mechanism and with the span for raising and lowering the span.

3. In a bascule-bridge, the combination of a span having an upwardly and downwardly movable end, a stationary support, movable supporting mechanism mounted upon the stationary support and pivotally connected with the span, oscillating anchor-arms pivotally connected with a stationary part, mechanism operatively connected with the anchor-arms and with the span for raising and lowering the swinging end of the span, and links pivotally connected with a stationary part and with the span for controlling the movements of the span.

4. In a bascule-bridge, the combination of a span having an upwardly and downwardly movable end, a stationary support, movable supporting mechanism mounted upon the stationary support and pivotally connected with the span, oscillating anchor-arms connected with a stationary part, mechanism operatively connected with the anchor-arms and with the span for raising and lowering the swinging end of the span, and means for supporting the span when in lowered position independently of the movable supporting mechanism.

5. In a bascule-bridge, the combination of a span having an upwardly and downwardly movable end, a stationary support, movable supporting mechanism mounted upon the stationary support and pivotally connected with the span, oscillating anchor-arms pivotally connected with a stationary part, rack-and-pinion mechanism operatively connected with the anchor-arms and with the span for raising and lowering the swinging end of the span, and links pivotally connected with a stationary part and with the span for controlling the movements of the span.

6. In a bascule-bridge, the combination of a span having an upwardly and downwardly movable end, a stationary support, movable supporting mechanism mounted upon the stationary support and pivotally connected with the span, oscillating anchor-arms connected with a stationary part, mechanism operatively connected with the anchor-arms and with the span for raising and lowering the swinging end of the span, means for supporting the span when in lowered position independently of the movable supporting mechanism, and links pivotally connected with a stationary part and with the span for controlling the movements of the span.

7. In a bascule-bridge, the combination of a span having an upwardly and downwardly movable end and provided with a counterweight, a stationary support, a track mounted upon such stationary support, supporting-segments movably mounted upon the track and pivotally connected with the span, links pivotally connected with a stationary support and with the span, and rack-and-pinion mechanism for raising and lowering the span.

8. In a bascule-bridge, the combination of a span having an upwardly and downwardly movable end and provided with a counterweight, a stationary support, a track mounted upon such stationary support, supporting-segments movably mounted upon the track and pivotally connected with the span, links pivotally connected with a stationary support and with the span, anchor-arms pivotally connected with a stationary part and movable adjacent to the span, and rack-and-pinion mechanism connected with the anchor-arms and with the span for raising and lowering the span.

9. In a bascule-bridge, the combination of a span having an upwardly and downwardly movable end and provided with a counterweight, a stationary support, a track mounted upon such stationary support, supporting-segments movably mounted upon the track and pivotally connected with the span, links pivotally connected with a stationary part and with the span, rack-and-pinion mechanism for raising and lowering the span, and means for supporting the span independently of rotary supporting mechanism when in lowered position.

10. In a bascule-bridge, the combination of a span having an upwardly and downwardly movable end, a stationary support upon which such span is mounted, anchor-arms pivotally connected to a stationary part and provided with racks thereon, and pinions mounted on the span engaging with the racks and adapted to be connected with a suitable source of power.

11. In a bascule-bridge, the combination of a span having an upwardly and downwardly movable end, a stationary support for supporting such span, anchor-arms pivotally connected to a stationary part and provided with racks thereon, pinions mounted on the span engaging the racks, and means for holding the pinions in engagement with the racks.

12. In a bascule-bridge, the combination of a span having an upwardly and downwardly movable end, a stationary support for supporting such span, anchor-arms pivotally connected to a stationary part and provided with racks thereon, pinions mounted on the span engaging the racks and adapted to be connected with a suitable source of power, and connecting-arms mounted upon the span and movably connected with the anchor-arms for holding the pinions in engagement with the racks.

13. In a bascule-bridge, the combination of a span, a stationary support, a track mounted upon such stationary support, rotatable supporting mechanism mounted upon the track and pivotally connected with the span at substantially its center of gravity, anchor-arms pivotally connected to a stationary part and provided with racks thereon, and pinions mounted on the span engaging the racks and adapted to be connected with a suitable source of power.

14. In a bascule-bridge, the combination of a span, a stationary support, a track mounted upon such stationary support, rotatable supporting mechanism mounted upon the track and pivotally connected with the span for supporting the span during its movements to open and closed position, anchor-arms pivotally connected to a stationary part and provided with racks thereon, pinions mounted on the span engaging the racks and adapted to be connected with a suitable source of power, and means for supporting the span when in lowered closed position independently of the rotatable supporting mechanism.

15. In a bascule-bridge, the combination of a span, a stationary support, a track mounted upon such stationary support, rotatable supporting mechanism mounted upon the track and pivotally connected with the span for supporting it during its movements to open and closed position, anchor-arms pivotally connected to a stationary part and provided with racks thereon, pinions mounted on the span engaging the racks and adapted to be connected with a suitable source of power, means for supporting the span when in lowered closed position independently of the rotatable supporting mechanism, and links pivotally connected with a stationary part and with the span for controlling the movements of the span.

THEODOR RALL.

Witnesses:
ANNIE C. COURTENAY,
JENNIE A. MACEDWARD.